US009865177B2

(12) United States Patent
Addie-Gentle

(10) Patent No.: US 9,865,177 B2
(45) Date of Patent: Jan. 9, 2018

(54) NUTRITION EDUCATION GAME FOR CHILDREN

(71) Applicant: Patricia R Addie-Gentle, Jonesboro, GA (US)

(72) Inventor: Patricia R Addie-Gentle, Jonesboro, GA (US)

(*) Notice: Subject to any disclaimer, the term of this patent is extended or adjusted under 35 U.S.C. 154(b) by 211 days.

(21) Appl. No.: 14/834,839

(22) Filed: Aug. 25, 2015

(65) Prior Publication Data
US 2017/0061819 A1 Mar. 2, 2017

(51) Int. Cl.
G09B 19/00 (2006.01)
A63F 3/04 (2006.01)
A63F 3/00 (2006.01)
A63F 9/18 (2006.01)
A63F 9/24 (2006.01)

(52) U.S. Cl.
CPC ........ *G09B 19/0092* (2013.01); *A63F 3/0478* (2013.01); *A63F 9/18* (2013.01); *A63F 2003/0063* (2013.01); *A63F 2003/0486* (2013.01); *A63F 2009/2472* (2013.01)

(58) Field of Classification Search
None
See application file for complete search history.

(56) References Cited

U.S. PATENT DOCUMENTS

| 4,832,347 A | 5/1989 | Monticolombi |
| 5,018,744 A | 5/1991 | Patracuolia |
| 5,333,877 A | 8/1994 | Pridgeon et al. |
| 5,758,876 A | 6/1998 | Frick et al. |
| 5,941,525 A | 8/1999 | Gallub |
| 6,464,223 B2 | 10/2002 | Rutter |
| 6,783,127 B2 | 8/2004 | Fish |

*Primary Examiner* — James Hull
(74) *Attorney, Agent, or Firm* — J. T. Hollin, Attorney at Law, P.C.

(57) ABSTRACT

The disclosed board game is designed to teach children basic nutrition principles in a fun-filled way. The game is designed to be played by a minimum of five players and/or teams. The game board depicts a fictional community where players have the task of planting nutritional foods in each of five gardens so as to provide nourishment to various sectors of the community. Players acquire colorful magnetic fruit and vegetable tokens to plant in their assigned gardens by correctly answering nutrition-related questions asked by a game facilitator. The first player or team to collect and plant all seven of the fruit and vegetable colors is the winner of the game. The object of the game is to enhance knowledge and understanding of the principles of personal nutrition, daily food consumption and meal planning.

7 Claims, 4 Drawing Sheets

Which meal gives you energy to start the day and fuel to focus during school?
a- Dinner
b- Lunch
c- Breakfast
d- Mid-morning snack Blueberries are a good souce of;
a- Protein
b- Caffeine
c- Grain
d- Antioxidants Which food is an example of a fat?
a- Margarine
b- Butter
c- Peanut buttter
d- All of the above Which color is an eggplant?
a- Yellow
b- Purple
c- Orange
d- Red For good balanced nutrition, how many meals should be consumed per day?
a- One meal
b- 2 meals
c- 3 meals
d- None, snacking frequently is okay Eating foods with unhealthy fats should be limited. Unhealthy fats are often found in goods like;
a- Pizza
b- Cookies and cakes
c- Fast foods
d- All of the above

FIG. 3

Dark green leafy vegetables like kale, collards, and turnips are rich in which minerals?
a- Calcium and iron
b- Potassium and sulphur
c- Iodine and copper
d- Vitamin D and iron Dairy products contain a high amount of,
a- Saturated fats
b- Unsaturated fats
c- Protein
d- Carbohydrates Which Vitamin contributes to smooth skin and good eyesight?
a- Vitamin D
b- Vitamin K
c- Vitamin A
d- Vitamin C Name a dairy product.
a- Yogurt
b- Alfredo sauce
c- Soup
d- Peanuts The serving labels tells you what?
a- The cost of the item
b- The temperature to cook the item
c- The nutritional value of the item
d- How the item tastes How many minutes of exercise do children need per day?
a- 30 minutes
b- 40 minutes
c- 50 minutes
d- 60 minutes or more

FIG. 4

NUTRITION EDUCATION GAME FOR CHILDREN

CROSS-REFERENCES TO RELATED APPLICATIONS

None

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

BACKGROUND OF THE INVENTION (1) Field of the Invention

The inventive concept herein relates to board games in general, and more specifically it relates to a board game which provides education and knowledge in the area of human nutrition and food cultivation in a complex society. The board game is created to provide an enjoyable means for children and adolescents to enhance their understanding of the effect of wise food choices on their overall health and fitness. The inventive concept falls within the category of board games, or electronic versions of board games, that requires some degree of concentration. The overall purpose of the board game is enhancing the recognition of, or to draw reasonable conclusions regarding elementary principles of nutrition and food cultivation, as each player or team competes with each other.

(2) Description of the Related Art, Including Information Disclosed Under 37 CFR 1.97 and 1.98

U.S. Pat. No. 7,118,108 B2 (Oct. 10, 2006) The present invention provides rules of play and game components for a game in which players may win by correctly predicting the order in which the moving pieces will reach the finish line. Players may influence the movement of the playing pieces on the pathways by playing movement cards or cards invoking special rules.

U.S. Pat. No. 6,783,127 (Aug. 31, 2004. A game board includes concentric circular areas (outer, middle, and center) each having a respective subset of piece locations. A barrier separates locations in the outer and middle areas and/or in the middle and center areas. Outer and middle area locations and some center area locations are disposed in a ring. Other center area locations are disposed inside the center ring. The barrier has two to four openings for pieces to pass through. A barrier separating the center and middle areas has at most four openings, preferably two aligned on a single diameter. Outer area locations have at least two different visual identifiers. A game includes providing a playing piece set to players, each set having one special piece and different other pieces identical to one another. Each player takes turns to prevent an opponent's special piece from being able to move without elimination of any piece during the game.

U.S. Pat. No. 6,464,223 (Oct. 15, 2002). A vehicle racing board game includes a racetrack having a start/finish line crossed by lanes and a pit area connected to the lanes. The lanes and the pit area are divided into a plurality of spaces including starting positions and a crash zone. Toy vehicles are used as playing pieces for advancing around the racetrack according to numbers generated by dice. The dice also are used to determine starting positions that set the order of play and identify a "crash". Points are awarded for winning the pole position, winning a lap and finishing position in each race of a season to determine a champion.

U.S. Pat. No. 5,941,525 (Aug. 24, 1999). A black widow board game (10) comprising a plurality of game pieces (12), in which a group of four of the game pieces (12) are color coded and used by one particular player during the game. A board (14) is provided, having a continuous path around its perimeter divided into consecutive spaces (16). Each of the spaces (16) bear instructions representing various tasks to do during the play of the game. Some of the spaces (16) represent amounts of money to be paid and received by each player, when one of the game pieces (12) lands thereon. There are four start position spaces (18), each located at one corner of the game board (14) to be used by a particular player to start the four game pieces (12) therefrom. There are also four home paths extending inwardly from each corner and divided into consecutive spaces (20) to be used by one particular player to reach a home space (22) to win the game.

U.S. Pat. No. 5,758,876 (Jun. 2, 1998). A new Board Game for challenging players to move all of their playing pieces from their start area to their home area. The inventive device includes a game board having a circuitous movement path disposed thereon, a plurality of sets of playing pieces for movement along the circuitous movement path of the game board, and a set of playing cards and a pair of dice each provided for determining movement along the circuitous movement path. The game board also has a plurality of starting lanes and plurality of finishing lanes disposed thereon. The starting lanes and the finishing lanes lead to and from the circuitous movement path, respectively.

U.S. Pat. No. 5,333,877 (Aug. 2, 1994). An improved board game apparatus is provided which consists of a game board having a continuous path around its perimeter divided into consecutive playing spaces of alternate colors with each of the two diagonal corner spaces being a start/home space and every corner having three additional inner playing spaces located thereby. A plurality of playing pieces are for each of the game players, with the playing pieces being of a size to fit within each of the playing spaces and are stackable one upon the other. A die operable by the game players is for determining the possible number of spaces the playing pieces shall move counterclockwise along the continuous path of the game board from the start/home space back to the start/home space.

U.S. Pat. No. 5,018,744 (May 28, 1991). A method and apparatus for playing a board game which includes two distinguishable sets of playing pieces, each set being assigned to one player of the game, and a playing surface divided into a grid-like array of playing spaces, surrounded by a border region. Various playing spaces are distinctively marked so as to create starting spaces, destination spaces, and holding zones for the respective sets of playing pieces. Movement of pieces is governed by the rolling of a pair of dice so designed as to offer fewer permutations than could occur from the rolling of conventional dice, resulting in a game wherein the outcome is relatively less dependent on chance and more dependent on skill. The object of the game is to be the first player to successfully move all of his pieces from the starting spaces, to the destination spaces, and finally into the adjacent border region.

U.S. Pat. No. 4,832,347 (May 23, 1989). A board game comprises a board defining an enclosed track of adjacent spaces. A spinner positioned at the center of the board has elements which randomly identify at least one of the spaces by pointing to the spaces. The game further comprises a plurality of playing pieces to be moved from space to space by players, and a pair of dice to indicate the number of spaces the playing pieces can be moved. According to the rules, if a spinner element randomly points to a space occupied by a playing piece, that playing piece may be removed from the board.

BRIEF SUMMARY OF THE INVENTIVE CONCEPT

The preferred embodiment of the disclosed game is designed to teach children between the ages of 5 years and 10 years basic nutrition principles in a fun-filled way. The game is designed to be played by a minimum of five players and/or teams. A maximum of fifteen players (three per each of the five teams) may play the game. The game depicts a fictional community, "Gardentown," and the players have the task of planting nutritional foods in each of five gardens so as to provide nourishment to various sectors of the community (a school, a post office, a hospital, a grocery store and a police station). The community landmarks are situated on streets throughout the city which are named for weather related activity. Each of the five sections of the community has its own metallic-inlaid garden space. Each garden can be manned by one player or a team composed of three players.

The Gardentown 2 game is known commercially as "Coloring My Plate With Pilot Rainbow." Players are able to obtain colorful, magnetized fruits and vegetable tokens to plant in their gardens by correctly answering nutrition-related questions initiated by the game facilitator. The object is to obtain all seven colors depicted on the game board rainbow to plant in each garden. The game continues until a player or a team of players has collected and planted fruits and/or vegetables containing six of the seven different colors of the rainbow. The game is played for an optimum total of six sessions, to provide the youth with an opportunity to gain knowledge and understanding of the principles of personal nutrition and daily food consumption and meal planning.

In the preferred embodiment of the game, it is intended that parents of the children who are players provide a certain amount of contributing information. This is accomplished by the parents responding with answers to a series of nutrition-related questions in a pre-assessment questionnaire, and also, a post-assessment questionnaire. The pre-assessment questionnaire is a series of questions which evaluates the parents' knowledge of basic nutrition principles and eating habits. This parental participation helps determine parental habits and trends in purchasing food items.

Success of the game can be measured at the end of the six sessions of the game if positive change can be identified from the pre- and post-assessment questionnaires given to parents.

BRIEF DESCRIPTION OF THE VIEWS OF THE DRAWINGS

FIG. 3 is an illustration of a selected few of the laminated game cards.

FIG. 4 is illustrative of a selected few of the laminated game cards.

DETAILED DESCRIPTION OF THE INVENTIVE CONCEPT

The objects, features, and advantages of the inventive concept presented in this application are more readily understood when referring to the accompanying drawings. The drawings, totaling four figures, show the basic components and functions of the preferred embodiment and at least one alternate embodiment. In the several figures, like reference numbers are used in each figure to correspond to the same component as may be depicted in other figures.

Figure 1:
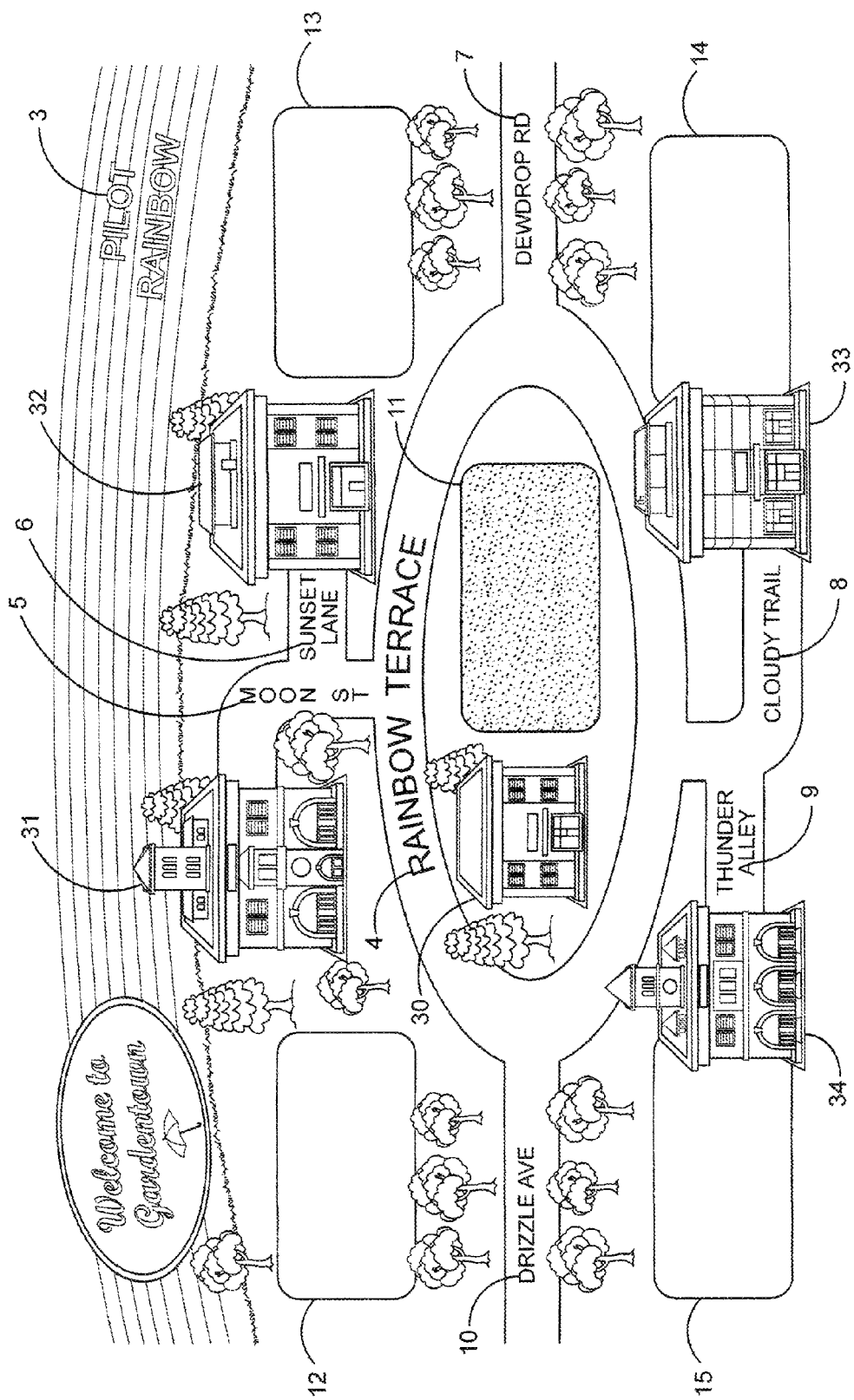
FIG. 1 illustrates a view of the Game Board 2 used by participants.

The discussion of the inventive concept will be initiated with FIG. 1, which illustrates a rendering of the Game Board 1 used by participants in the fictional "Gardentown" 2. The primary area of competitive efforts among the players or teams is focused on the five gardens on the Game Board 1, which are designated as a first garden 11, a second garden 12, a third garden 13, a fourth garden 14, and a fifth garden 15.

The game, in its preferred embodiment, is designed for five players or five teams: a first player/team 51, a second player/team 52, a third player/team 53, a fourth player/team 54, and a fifth player/team 55. The rules of Gardentown 2 game require that each of the players/teams work one of the five gardens 11-15. If a team 51-55 is assigned to work one of the five gardens 11-15, the team may not be comprised of more than three individuals. As a result, the maximum number of individual players for the Gardentown 2 game is limited to fifteen persons.

As shown in FIG. 1, the Gardentown 2 community consists of five sectors: the grocery 30, the school 31, the police station 32, the hospital 33, and the post office 34. Each sector 30-34 of the community has its own garden space 11-15, and each of the gardens 11-15 is comprised of a metallic substance for secure placement of specially designed and colored magnetized game pieces 40-46 (representing fruits and/or vegetables) upon the garden spaces 11-15.

Figure 2:
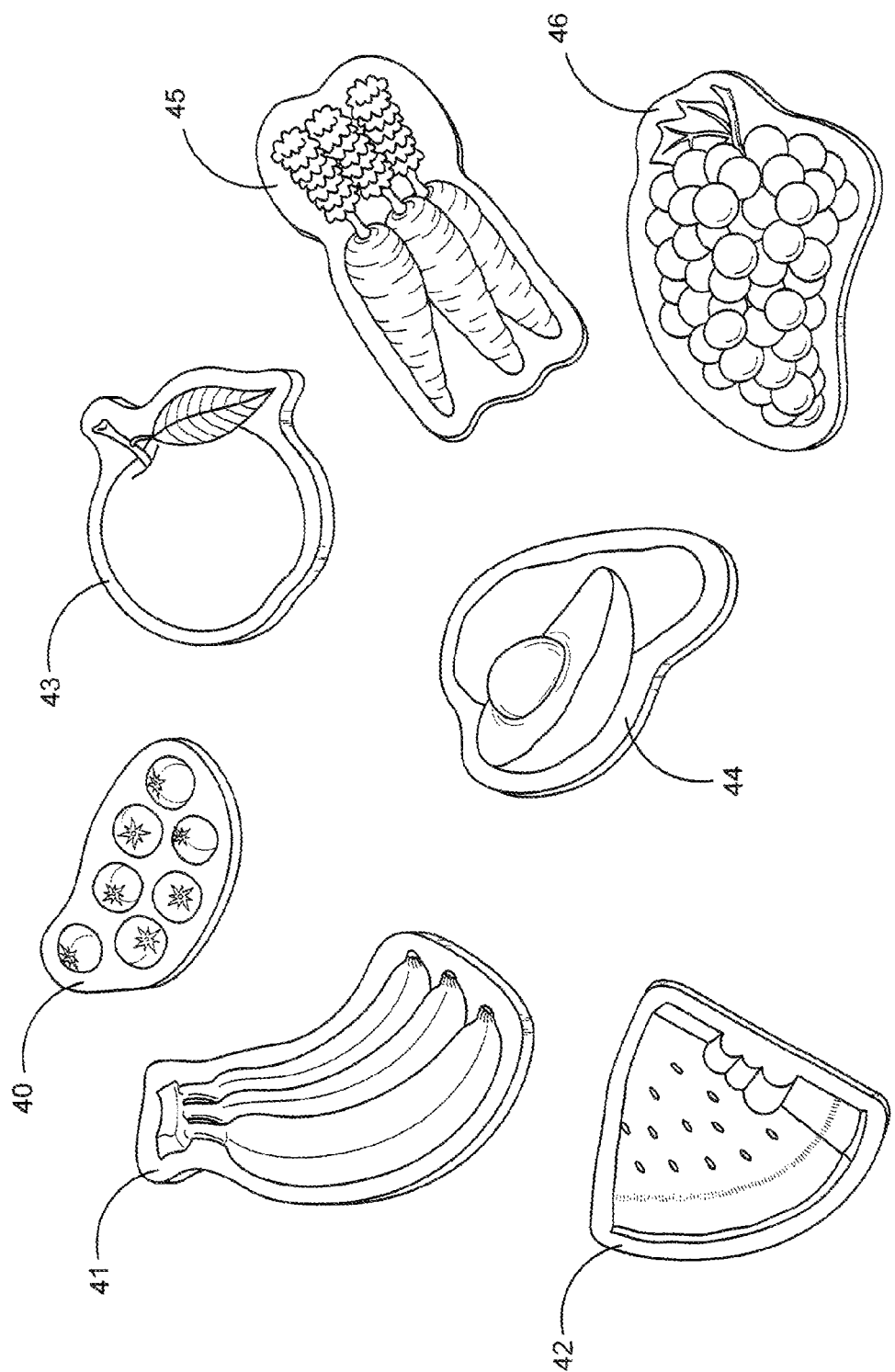
FIG. 2 depicts several of the typical fruit and vegetable game pieces.

FIG. 2 illustrates a selected few of the game pieces 40-46, all being colored tokens, utilized by the players or teams. The game pieces shown in FIG. 2 include blueberries 40, utilizing an indigo/violet color, bananas 41 emphasizing the color yellow, watermelon 42 featuring the color red, oranges 43 featuring the color orange, avocado 44 showing primarily the color green, carrots 45 emphasizing the color orange, and raspberries/strawberries 46 depicting a red color. The Gardentown 2 game is structured such that there are six "community colors," at least one of these colors appearing on each of the vegetable and fruit game pieces 40-46.

The Game Board 1, shown in FIG. 1, is a flexible and foldable smooth-surfaced platform, approximately ⅛ inch thick, 24.0 inches in width, and 36.0 inches in length, in its preferred embodiment. Each of the garden spaces 11-15, comprise a thin metallic surface, enabling the secure affixation of each of the magnetized game pieces 40-46 during the course of playing the game. The magnetized game pieces 40-46 are approximately 1.0 inch in length and width and approximately ⅛ inch thickness. A total of forty-eight (48) game pieces 40-46 are included in the game package. The Pilot Rainbow 3 game piece is approximately the same size as other game pieces and is also magnetized.

On the game board 1, the Gardentown 2 community is further laid out with seven named streets: Rainbow Terrace 4, Moon Street 5, Sunset Lane 6, Dewdrop Road 7, Cloudy Trail 8, Thunder Alley 9, and Drizzle Avenue 10. The street names generally can be associated with weather phenomenon or weather conditions related to crop planting, gardening, and care of planted vegetables and/or fruit.

The sequence of activity in the game is divided into six sessions. In the preferred embodiment, the game is played over a period of six weeks. This enables child participants 51-55 to reinforce the nutrition information they learn over a relatively long period of time.

At the start of the first session of playing the Gardentown 2 board game a facilitator 50 (not shown in the drawings) reads a series of multiple choice questions. The facilitator 50 uses laminated game cards 70-81, each card containing printed questions directly related to food, nutrition, and physical activity/exercise. A few examples of the questions which are printed on the laminated game cards 70-81 are shown in FIG. 3 and FIG. 4. Each team or player is given a battery-powered buzzer or clacker which is used to notify, the facilitator 50 that the team or player believes he/she knows the answer to a question posed by the facilitator 50.

The responses of the players/teams 51-55 during the game are used to determine the level of their success in acquiring knowledge of nutrition and health at the end of the Gardentown 2 board game.

Once the game starts, the facilitator 50 reads a first question and each of the five players/teams 51-55 has an opportunity to activate their team buzzer 56 (not shown) if they think they know the answer. The player/team 51-55 who buzzes first is given the opportunity to answer. The buzzer 56 is located in the area where the game is being played so that it is visible to the players and for the facilitator 50. The buzzer 56 is a purchased system including a lighted column that indicates who buzzed first. Each player 51-55, or each team of players has an individual hand-held buzzer 56 to press when they think they know the answer.

If the correct answer is provided, the player/team 51-55 is given a magnetic fruit or a vegetable game piece 40-49 (their choice of color) to plant in the garden for their assigned community garden space 11-15.

If an incorrect answer is given, the player/team who buzzed second is given an opportunity to answer the question. If their answer is also incorrect, other players/teams have the opportunity to provide the answer. If the correct answer is not forthcoming by any of the players/teams 51-55, the facilitator 50 verbally gives the answer and a second question is then asked. The game facilitator 50 will use appropriate educational tools and/or visual aids to rationally explain why an answer (or answers) is incorrect and to further support the correct answer. The laminated game cards 70-81 shown in FIG. 3 and FIG. 4 present a small sampling of the total universe of questions which are available to the facilitator 50 during playing of the game. The object of the game is to plant six (6) colors of the rainbow in one of the garden plots 11-15. Therefore colors (tokens) must be available for the players 51-55 to compete and eventually obtain all the colors to win the game. The player or team of players 51-55 who/which collects all six colors first is the winner.

Scientifically, the rainbow has seven colors, however the Gardentown 2 game uses only six colors, primarily because it is difficult to find violet, blue and indigo fruits and vegetables and to differentiate between those colors.

Eight game tokens 40-46 of each color are used in the following manner:

RED: Watermelon, strawberries, cherries, apples, red peppers, tomatoes, radishes, and raspberries;
ORANGE: oranges, carrots, orange peppers, peaches, pumpkins, and cantaloupes;
YELLOW: corn, lemons, yellow peppers, bananas, yellow pears, pineapples, grapefruit, and yellow onions;
BLUE: blueberries, and blue cauliflower;
GREEN: avocado, kiwi, green cabbage, green peas, green pears, green grapes, celery, and asparagus,
INDIGO/VIOLET: purple plums, purple cabbage, purple carrots, beets, purple onions, eggplants, and grapes.

Duplicate fruits or vegetables are used when eight items are not available in a color grouping. For example, in a game set, there may be two blueberry tokens 40 and in some instances, three.

A player or a team of players 51-55 can select any color when a question is correctly answered, however when the same player or team of players 51-55 answers a second question correctly, a different color should be selected, since the object is to collect all six colors). When a third question is answered correctly, a third (different) color should be selected, and so on.

As the first session of the game continues, each team/player 51-55 competes to answer each of the game questions 70-81 correctly. Each time a correct answer is given to the facilitator's 50 question, the facilitator 50 awards the player or team (51-55) a colorful magnetic fruit or vegetable token (40-49) to plant in the player's or team's 51-55 respective garden (11-15). The object of the game is for a team or player 51-55 to obtain all six colors of the rainbow, (the colors being represented by the various fruit and vegetable tokens 40-49) and "plant" the tokens in the each garden 11-15). The first player or team 51-55 to collect all six magnetic colors is the winner of the first phase of the game.

The second session of the Gardentown 2 game begins to give emphasis to the Pilot Rainbow 3 game token, which is a puppet-like game piece manipulated by the facilitator 50. The Pilot Rainbow 3 is brought into the game when a facilitator's question relating to sowing and growing of plants is answered correctly by a player or team 51-55. The Rainbow Pilot 3 navigates the helicopter to crop-dust, and to spray water and fertilizer to produce fertile soil and to promote healthy growth of the fruits and vegetables 40-49 planted in the community gardens 11-15. The game is played in the exact same manner except the questions being asked by the game facilitator 50 pertain to principles of sowing and growing the fruit and vegetables in the community gardens 11-15.

The game is facilitated over six playing sessions with questions being randomly selected by the facilitator 50. As explained earlier, the first session of the game emphasizes basic nutrition questions. The second session incorporates repeating a few questions from the first session, but also presents new questions related to label reading and combination foods. Each of the six sessions builds by adding more advanced questions while reviewing questions from the previous session(s).

The multiple choice questions asked of players 51-55 during the game sessions are categorized as follows:
Session I: General nutrition
Session II: Fats, Dairy, Fast Foods, Snacks and Beverages
Session III: Fruits and Vegetables
Session IV: Cereals and Grains/Breakfast
Session V: Proteins, Sowing and Growing (appearance of Pilot Rainbow 3);
Session VI: Label Reading and Menu Planning
The game mascot "Pilot Rainbow" is introduced during Session V. The Pilot Rainbow 3 is navigated by the game facilitator 50. Pilot Rainbow 3 has the ability to deliver water and simulated fertilizer to the garden plants when sowing and growing questions are answered correctly after the fruits and vegetables have been planted.

Completion of all six sessions is necessary to adequately measure success of learning of the players/teams 51-55 from the activities presented during the sessions. In the preferred embodiment, the game sessions are presented weekly to effectively allow time for participants 51-55 to demonstrate change. At the end of the six sessions, participants 51-55 will have the opportunity to simulate a healthy meal plan for a twenty-four hour period by using food models.

In the preferred embodiment of the Gardentown 2 game, it is desirable that parents of the children who are players 51-55 provide a certain amount of helpful input in the form of responding with answers to a pre-assessment questionnaire and also a post-assessment questionnaire. The pre-assessment questionnaire is a series of questions which evaluates the participants' knowledge of basic nutrition principles and eating habits. This parental participation is critical to determine parental purchasing trends.

Success of the game can be measured at the end of the six sessions of the Gardentown 2 game if positive change can be identified from the pre- and post-assessment questionnaires. For example, if at pre-assessment questioning, a parent answers that he/she most often purchases whole milk, it is desired that by the time of the post-assessment questionnaire, the answer changes to low-fat, or reduced-fat milk. The players 51-55 are not given game scores or awarded fruit/vegetable tokens 40-46 during the conduct of the pre-assessment questionnaire with their parents.

While preferred embodiments of the present inventive concept have been shown and disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A method of playing a nutrition education board game, the game board comprising a playing surface, said surface imprinted with the layout of a small fictitious community, the community including a school, a post office, a hospital, a grocery store, a police station, seven streets named for weather phenomenon, and five community gardens, the community gardens comprising a metallic surface, the method comprising:
    a) providing for the selection of five individual players between the ages of five years and ten years of age to compete in playing the nutrition education board game;
    b) assigning a specific community garden to each player;
    c) providing at least forty magnetized game tokens representing a variety of different-colored fruits and vegetables, said game tokens displaying six different colors;
    d) providing a "Pilot Rainbow" puppet-like game piece which engages in the proper watering and care of the food tokens planted in the community gardens;
    e) providing a plurality of laminated game cards, each card imprinted with a question, below which is imprinted a plurality of choices of answers, said question relating to human nutrition, food categories, crop cultivation, and food selection;
    f) providing a game facilitator who maintains custody and control of said fruit and vegetable tokens, the laminated game cards, and whose game function is to ask of individual players a question imprinted upon a randomly-selected game card;
    g) providing each player with a battery-powered buzzer or clacker which is used to notify the facilitator of a possible correct answer;
    h) providing that the facilitator verbalize a question to the players, said question imprinted on one of said-cards;
    i) giving to the player being the first to press a game buzzer in anticipation of answering a question, the opportunity to respond to the facilitator's question;
    j) awarding a specifically requested color fruit or vegetable token to the player who gives the correct response to the facilitator's question read;
    k) requiring that the player having requested and received a specific fruit or vegetable token, plant said fruit or vegetable token in the player's garden by placing the token on the metallic surface of the specific community garden assigned to the player;
    l) repeating steps (h) through (k) until such time as one player has planted fruit and/or vegetable tokens containing all six of the colors defining the game;
    m) declaring the player that first plants fruits and/or vegetables containing all the six colors of the community in his/her garden as winner of the game.

2. A method as in claim 1, wherein, after providing for the selection of five individual players between the ages of five years and ten years of age to compete in playing the nutrition education board game, requiring that parents of said players respond to a pre-assessment questionnaire pertaining to human nutrition; and further, requiring that, after the declaration of the winning player, the parents of said players respond to a post-assessment questionnaire pertaining to human nutrition, food selection, and preparation.

3. A method of playing a nutrition education board game, for five teams of players ranging in age from five years to ten years, comprising the steps of:
    a) providing a board having a game playing surface, said surface imprinted with the layout of a small fictitious community, said community including a school, a post office, a hospital, a grocery store, a police station, seven streets named for weather phenomenon, and five community gardens, the community gardens comprising of a metallic surface;
    b) providing for the selection of fifteen individual players between the ages of 5 years and 10 years three of which will be placed on one of five teams, to compete in playing the nutrition education board game;
    c) providing at least forty magnetized game tokens representing a variety of different-colored fruits and vegetables, said game tokens displaying six different colors;
    d) providing a "Pilot Rainbow" puppet-like game piece which engages in the proper watering and care of the food tokens planted in the community gardens;
    e) providing a plurality of laminated game cards, each card imprinted with a question, below which is imprinted with a plurality of choices of answers, said question relating to human nutrition, food categories, crop cultivation, and food selection;
    f) providing a game facilitator who maintains custody and control of said fruit and vegetable tokens, the laminated game cards, and whose game function is to ask of the teams a question imprinted upon a randomly selected game card;

g) assigning a specific community garden to each team;

h) providing each player with a battery-powered buzzer or clacker which is used to notify the facilitator of a possible correct answer;

i) providing that the facilitator verbalize a question of the teams, said question imprinted on one of said laminated cards, and further, said question querying each team's knowledge of a certain area of human nutrition;

j) giving to the team being the first to press the game buzzer the opportunity to respond to the facilitator's question;

k) teams that are familiar with the correct answer responding to the question asked by the facilitator and being the first to give the correct response;

l) awarding a specifically requested color fruit or vegetable token to the team which gives the correct response to a question read from one of said laminated cards;

m) requiring that the team having requested and received a specific fruit or vegetable token, plant said fruit or vegetable token in the team's garden by placing the token on the metallic surface of the specific community garden assigned to the player;

n) repeating steps i) through m) until such time as one team has planted fruit and/or vegetable tokens containing all six of the colors defining the game;

o) declaring the player or team that first plants fruits and/or vegetables containing all the six colors of the community in its garden as winner of the game.

4. A method as in claim 3, wherein, after providing for the selection of fifteen individual players between the ages of five years and ten years of age to compete on five teams in playing the nutrition education board game, requiring that parents of said team members respond to a pre-assessment questionnaire pertaining to human nutrition; and further, requiring that, after the declaration of the winning team, the parents of said players on of each of the five teams respond to a post-assessment questionnaire pertaining to human nutrition, food selection, and food preparation.

5. A method of teaching healthful human nutrition planning and food management to youth, comprising the steps of:

a) providing a board game having a game playing surface, said surface imprinted with the layout of a small fictitious community, the community including a school, a post office, a hospital, a grocery store, a police station, seven streets named for weather phenomenon, and five community gardens, the community gardens comprising of a metallic surface;

b) selecting individual players between the ages of 5 years and 10 years to compete in playing the board game;

c) providing at least forty magnetized game tokens representing a variety of different-colored fruits and vegetables, said game tokens displaying six different colors;

d) providing a "Pilot Rainbow" puppet-like game piece which engages in the proper watering and care of the food tokens planted in the community gardens;

e) providing a plurality of laminated game cards, each card imprinted with a question, below which is imprinted a plurality of possible answers, said question relating to human nutrition, food categories, crop cultivation, and food selection;

f) providing a game facilitator who maintains custody and control of said fruit and vegetable tokens, and the laminated game cards;

g) assigning a specific community garden to each player;

h) providing each player with a battery-powered buzzer or clacker;

i) providing that the facilitator select a game card and verbally direct the question on the game card to the players, collectively;

j) allowing the player first pressing his/her buzzer or clacker the opportunity to respond to the question;

k) awarding a specifically requested color of a fruit or vegetable token to the player giving the correct response to the question read;

l) requiring that the player responding with the correct response plant the awarded fruit or vegetable token in the player's garden by placing the token on the metallic surface of the specific community garden assigned to the player;

m) repeating steps i) through l) until such time as one player has planted fruit and/or vegetable tokens containing all six of the colors defining the game;

n) declaring the player that first plants fruits and/or vegetables containing all the six colors of the community in his/her garden as winner of the game.

6. A method as in claim 5, wherein the game facilitator selects individual players to be placed, on at least two teams, the teams thereafter compete against each other in playing the game, under the same rules as for individual players.

7. A method as in claim 5, wherein, prior to playing the board game, parents of the players respond to a pre-assessment questionnaire pertaining to human nutrition; and further, requiring that, after the declaration of the winning player, the parents of said player respond to a post-assessment questionnaire pertaining to human nutrition, food selection, and food preparation.

* * * * *